United States Patent [19]

Burkhart

[11] 4,063,294
[45] Dec. 13, 1977

[54] TAPE CARTRIDGE LOADING MECHANISM

[75] Inventor: Ernest C. Burkhart, Bellingham, Wash.

[73] Assignee: Northwestern Technology, Inc., Bellingham, Wash.

[21] Appl. No.: 606,941

[22] Filed: Aug. 22, 1975

[51] Int. Cl.² .................. G11B 15/68; G11B 23/04
[52] U.S. Cl. .................................................. 360/92
[58] Field of Search .................. 360/92, 94, 71, 91, 360/93, 85; 242/197–200, 194, 180–181

[56] References Cited

U.S. PATENT DOCUMENTS

| | | | |
|---|---|---|---|
| 3,494,622 | 2/1970 | Zeigler, Jr. | 360/92 |
| 3,511,508 | 5/1970 | Ban | 360/92 |
| 3,632,897 | 1/1972 | Ban | 360/94 |
| 3,682,480 | 8/1972 | Ban | 360/92 |
| 3,807,741 | 4/1974 | Uemura | 360/92 |

Primary Examiner—Alfred H. Eddleman
Attorney, Agent, or Firm—Seed, Berry, Vernon & Baynham

[57] ABSTRACT

A carousel provides a plurality of standard tape cartridges on demand at a tape loading station. At the tape loading station a transfer mechanism grasps the cartridge and pulls it forwardly into a freely movable play position. In the play position a standard pinch roller is swung into the play position holding the tape against a capstan. A unique feature of the transfer mechanism is that the cartridge is moved by a roller carriage in such a manner that the cartridge travels a much greater distance than the roller carriage to accellerate the speed of travel for rapid insertion and retraction of cartridges and more importantly to minimize the travel of the transfer mechanism while gaining substantial travel of the cartridge.

9 Claims, 7 Drawing Figures

TAPE CARTRIDGE LOADING MECHANISM

BACKGROUND OF THE INVENTION

1. Field of the Invention

This invention pertains to cartridge transfer mechanism for multiple cartridge playback apparatus, especially of the type in which a plurality of tape cartridges are carried in a conveyor.

2. Description of the Prior Art

Various mechanisms have been available in the prior art for loading a tape cartridge using a conveyor. In general, however, these mechanisms have been unsatisfactory since they are complicated and expensive to manufacture, require an undue amount of time and travel distance to move the cartridge from the conveyor to the playback position and return the cartridge back to the conveyor when the tape has been played.

SUMMARY OF THE INVENTION

It is an object of this invention to provide a conveyor with a tape cartridge loading mechanism which is inexpensive to manufacture.

It is another object of this invention to provide a tape cartride loading mechanism which advances the cartridge from a conveyor to a tape playback position in a very rapid manner.

It is still another object of this invention to provide a roller carriage for grasping a tape cartridge in a conveyor and advancing the tape cartridge through a travel distance greater than the roller carriage itself travels.

Basically these objects are obtained by providing a loading station adjacent the exposed ends of a plurality of tape cartridges in a conveyor with a roller carriage mechanism positioned at the loading station. The roller carriage mechanism is uniquely provided with a pair of pinch rolls which move along opposed rails and rotate as they are moved. A roller carriage is slid toward the playback station drawing the rollers against the cartridge, pulling it from the conveyor with the roller movement of the rollers adding an additional distance component to the tape cartridge so that it advances relative to the roller carriage as the roller carriage is slid towards the playback position. The rollers are automatically parted at the playback position to free the cartridge for movement by the conventional pinch roller mechanism of a playback table. Return of the cartridge to the conveyor is done in the reverse manner with the grasping rollers again adding an additional distance component to movement of the cartridge relative to the carriage.

As is readily apparent, the dual function of the grasping rollers, that is, to grasp the cartridge for removal from the conveyor and the simultaneous rotation of these rollers to add an increased travel component on the cartridge relative to the rollers, is a very simple but effective mechanism for advancing the cartridge in a minimum amount of time and in a confined space. Furthermore, the grasping rollers automatically grasp and release the cartridge at the loading station and at the playback station so that the cartridge is always free to be moved at these opposite stations. The roller carriage mechanism is advantageously very simple in operation.

DETAILED DESCRIPTION OF THE PREFERRED EMBODIMENTS

Figure 1:
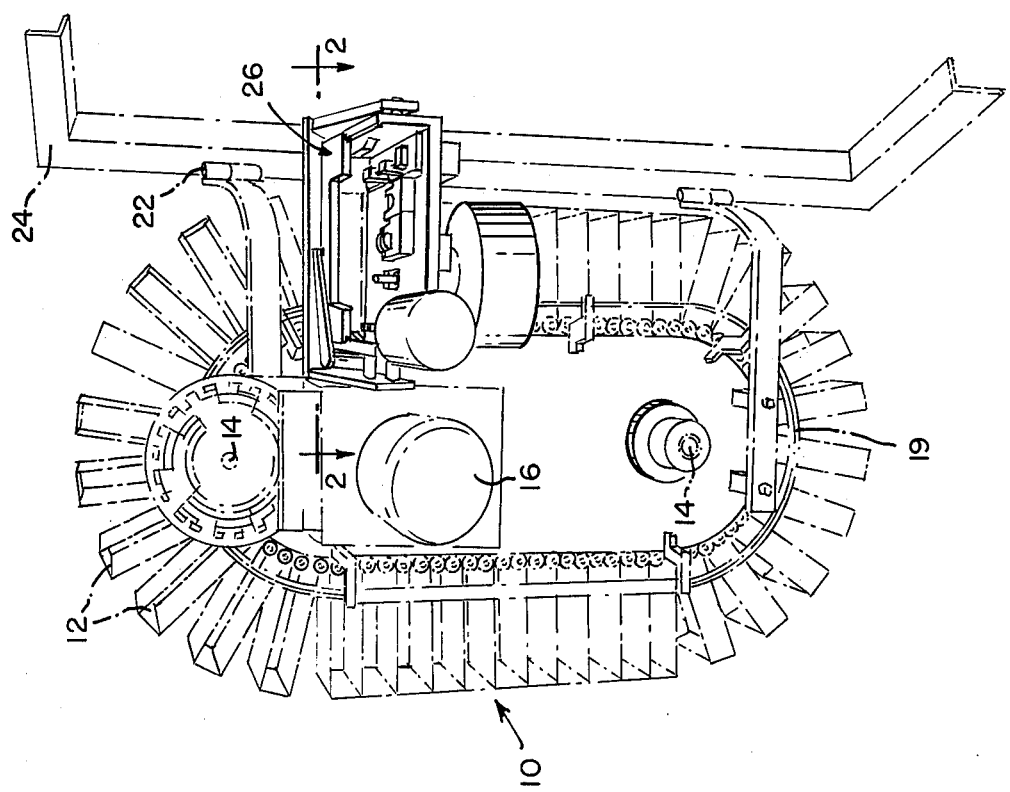
FIG. 1 is an isometric of a conveyor having a plurality of tape cartridges which are delivered to a unique cartridge transfer mechanism. Z

As best shown in FIG. 1, a conveyor 10 is provided with plurality of compartments 12 each of which hold a standard tape cartridge C. The conveyor is provided with a set of sprockets (not shown) at its upper and lower ends which rotate on spindles 14. A motor 16 drives the upper spindle and thus the sprockets to drive a pair of belts 18 and move the compartments 12 past a loading station LS. In the preferred embodiment the conveyor and the loading operation are performed electronically by a programmed microprocessor, however, the mechanism also can be operated by manually controlled switches. For the purpose of this description, the details of the invention will be described with reference to the manual operation.

A guide bar 19 is provided at the forward side of the conveyor as best shown in FIG. 1 against which the cartridges are abutted by a roller 20 on the rearward side of the conveyor at the loading station. That is, as each cartridge passes the roller 20 it is positively moved against the track 19 to position the cartridge at the loading station for advancement into the playback station PS. The bar 19 is discontinued only at the loading station to enable the cartridges to be withdrawn from the conveyor compartments. The conveyor and transfer mechanism are preferably pivotally mounted by pins 22 to the chassis of a console 24 and thus can be swung out of the console for inspection or maintenance.

Figure 2:
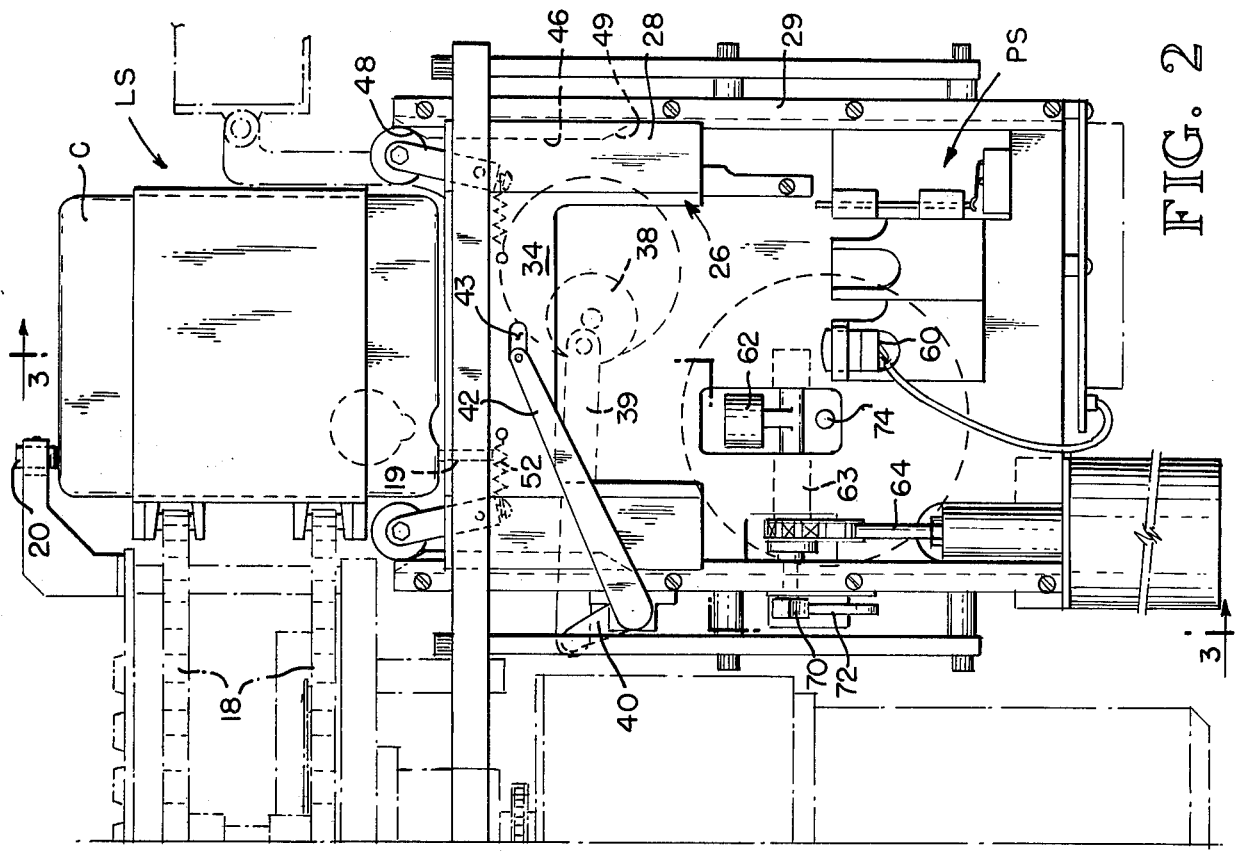
FIG. 2 is a fragmentary horizontal section taken along the line 2—2 of FIG. 1.
Figure 3:
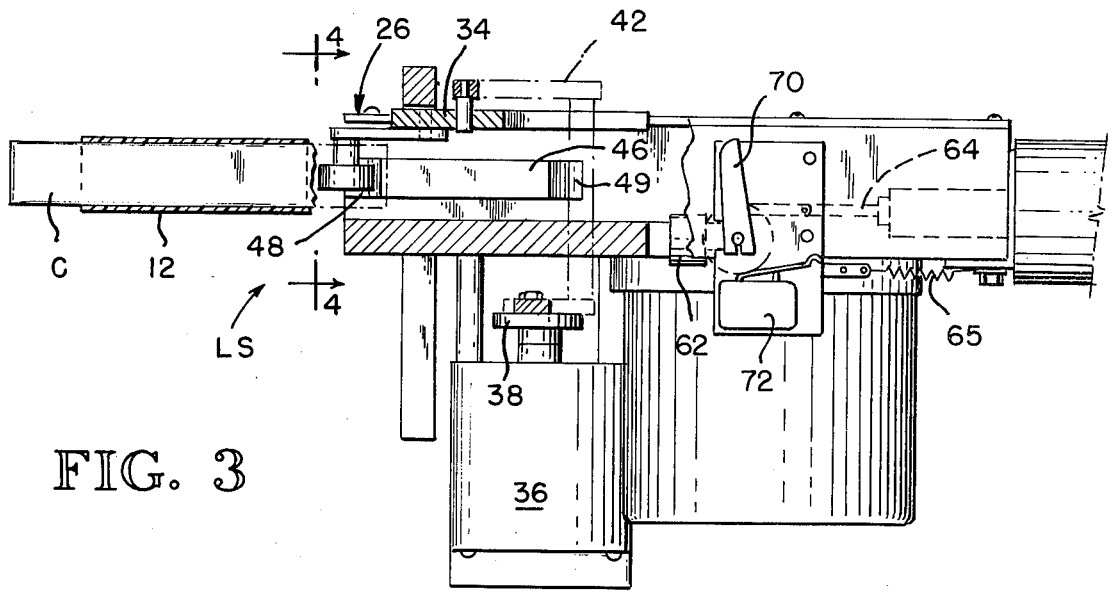
FIG. 3 is a section taken along the line 3—3 of FIG. 2 with parts broken away for clarity.
Figure 4:
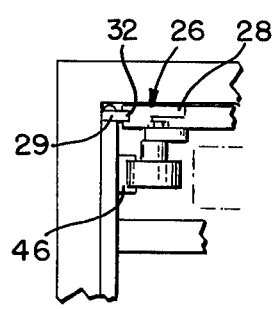
FIG. 4 is a fragmentary detail taken in the direction of the arrows 4—4 in FIG. 3.

The unique transfer mechanism 26 is best shown in FIGS. 2 and 3 and includes a roller carriage 28 which rides in a pair of opposed guideways 29 to pull the cartridge from the loading station to the playback station. As is best shown in FIG. 4, a set of gibs are provided with slots 32 which slide on the guideways 29. A plate 34 connects the gibs together to form a unitary slidable assembly which is movable along the guideways 29 between the position shown in FIG. 5 and the position shown in FIG. 7.

A motor 36 is connected to an eccentric 38 which is pivotly connected to a linkage arm 39. The linkage arm is in turn connected to a bell crank 40 having its opposite end connected to an actuating arm 42. The actuating arm terminates in a pin which rides at a slot 43. As is readily apparent from FIGS. 5—7 rotation of the motor 36 pivots the actuating arm 42 to advance the roller carriage between the loading station and playback station. Conversely, the opposite rotation of the motor 36 will return the roller carriage to its loading station position.

Figure 5:
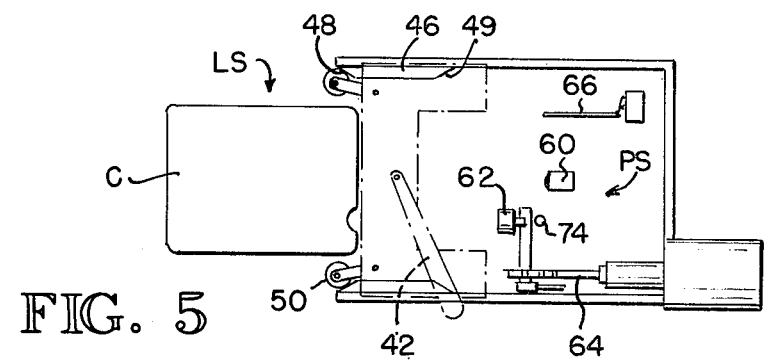
FIG. 5 is an operational schematic illustrating the position of a tape cartridge in the conveyor.
Figure 6:
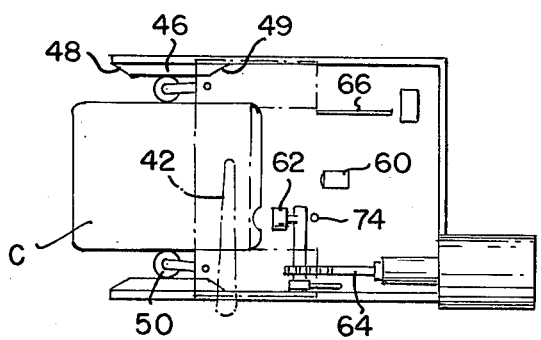
FIG. 6 is a second operation schematic illustrating the transfer mechanism advancing the tape cartridge into the playback station.
Figure 7:
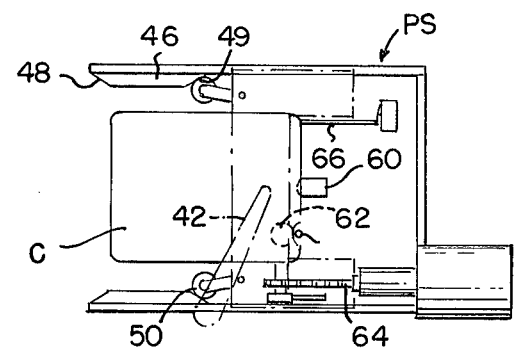
FIG. 7 is an operational schematic illustrating the transfer mechanism in its forward most position with the tape cartridge in the playback position.

Provided immediately below the guideways are a set of rails 46 each having a roller closing ramp 48 and a roller opening ramp 49 (depending upon direction of travel). Pivotly secured to the plate 34 are a pair of grasping rollers 50 of rubber or other suitable resilient material. The rollers 50 are urged apart from one another by springs 52. As is readily apparent, movement of the roller carriage from left to right as shown in FIGS. 5–7 will first advance the grasping rollers up the ramps 48 to close the rollers tightly on opposite sides of the cartridge C. As the roller carriage is advanced further toward the playback station PS, the rollers 50 roll against the rails 46. The rotation of the grasping rollers is transferred into additional movement of the cartridge C in the forward direction thus advancing the cartridge through a distance which is approximately twice the distance of travel of the roller carriage itself. This is best observed by comparing the position of the cartridge C with the roller carriage in each of the operational views 5–7. In one actual embodiment the cartridge travel distance is 5 ⅜inches compared to 2 11/16 inches of carriage travel. This benefits both the rapidity of transfer and the space requirements for the carriage and carriage actuating mechanism. As the grasping rollers 50 reach the opening ramp 49, the rollers open under the pressure from the springs 52 to release the cartridge at the playback station. The cartridge is thus immediately released and able to be now positioned and controlled by the standard playback pinch roller mechanism at the playback station.

The standard playback station is provided with playback heads 60 and a standard pinch roller 62. The pinch roller is mounted on a shaft 63 which is rotated by a solenoid operated sprocket mechanism 64. When the solenoid is de-energized, a spring 65 returns the pinch roller to its lower position. A switch 66 is engaged by the cartridge at the playback station to signal when the cartridge has reached the playback station. The closing of the switch 66 de-energizes the conveyor so that the conveyor cannot be accidently moved while the cartridge is in the playback station. Likewise a switch 70 is engaged by an arm 72 keyed to the shaft 63 to signal when the pinch roller is in its upper position and causing the tape to be moved against the playback head and against the tape capstan 74.

While the preferred embodiments of the invention have been illustrated and described, it should be understood that variations will be apparent to one skilled in the art without departing from the principles described herein. Accordingly, the invention is not to be limited to this specific embodiment illustrated in the drawings.

The embodiments of the invention in which a particular property or privilege is claimed are defined as follows:

1. A tape cartridge loading mechanism for moving one of a plurality of tape cartridges to a playback station for engagement by a tape actuating drive and playback head, comprising:
   a tape cartridge conveyor for carrying a plurality of tape cartridges to a loading station, said conveyor having means for holding a plurality of cartridges each with an end exposed at the loading station,
   carriage means positionable at said loading station for moving a cartridge out of said cartridge holding means and into said playback station, said carriage means including a set of opposed grasping rollers moveable toward one another into engagement with opposite sides of the exposed end of said cartridge for grasping the cartridge, actuating means for advancing said rollers along a path toward said playback station, and means for moving the rollers into engagement with the cartridge at the loading station and out of the engagement from the cartridge at the playback station for releasing the cartridge to the tape actuating drive.

2. The loading mechanism of claim 1, said carriage means further including means for increasing the distance the cartridge is moved over the distance the roller advancing means is moved for gaining in increased travel of the cartridge with a minimum travel of the roller advancing means.

3. The loading mechanism of claim 2, said cartridge travel increasing means including rail means engageable with the grasping rollers as they are moved along said path for adding a rotational movement to the rollers which is transmitted to the cartridge to further advance the cartridge as the rollers move along the path.

4. The loading mechanism of claim 1, said actuating means for advancing the rollers including guide tracks on opposite sides of said path, a slidable assembly rotationally connected with said rollers and movable along said guide tracks, an actuating arm slidably connected to said slidable assembly, and linkage means for pivoting said actuating arm to move said slidable assembly.

5. The loading mechanism of claim 1, said conveyor including a pair of spaced flexible carrier chains connected to said compartments, a guide bar positioned along the forward ends of said compartments and discontinued at said loading station for holding the cartridges against forward movement in the compartments except at said loading station, and means for urging the cartridges against said guide bar for positioning the cartridges at the loading station.

6. The loading mechanism of claim 5, said carriage means further including means for increasing the travel of the cartridge over the travel of the roller advancing means for increasing the distance traveled by the cartridge, said cartridge travel increasing means including means engageable with the grasping rollers as they are moved along said path for adding a rotational movement to the rollers which is transmitted to the cartridge to further advance the cartridge as the rollers move along the path.

7. A tape cartridge loading mechanism for moving one of a plurality of tape cartridges of the type having opposite smooth sides and an exposed tape end to a playback station for engagement by a tape actuating drive and playback head comprising:
   tape cartridge storage means for holding a plurality of tape cartridges,
   transfer and delivery means separate from said storage means and operable for engaging a cartridge in said storage means, delivering the cartridge to said playback station, and completely releasing the cartridge at said playback station,
   said transfer and delivery means including means reciprocably extendible along said opposite sides of said cartridge adjacent said exposed tape end and movable toward each other for grasping the smooth sides and advancing the cartridge exposed tape end first into a released playback position at said playback station.

8. The mechanism of claim 7, said grasping means including at least one set of opposed rollers, and ramp means engagable with said rollers for moving the rollers toward one another into said grasping position and having elongated rails engagable with the rollers for rotating the rollers as the rollers grasp the cartridge whereby the cartridge is advanced a distance greater than the rollers when moved to the playback station.

9. The mechanism of claim 8, said ramp means including opposed rearward ramps for moving the rollers against the cartridge and opposed forward ramps for moving the rollers away from the cartridge at the playback station, and including spring means for urging the rollers against the ramps.

* * * * *